July 25, 1967     W. W. H. CLARKE     3,332,276
SLUSH DRAG METERS
Filed Nov. 10, 1964     2 Sheets-Sheet 1
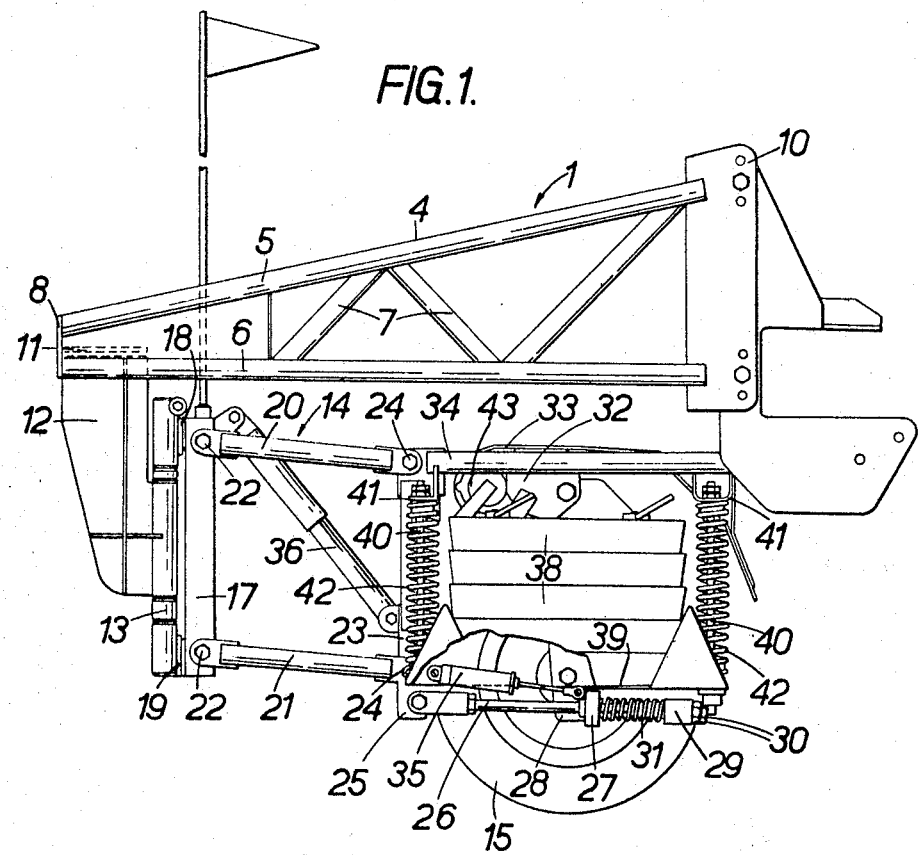
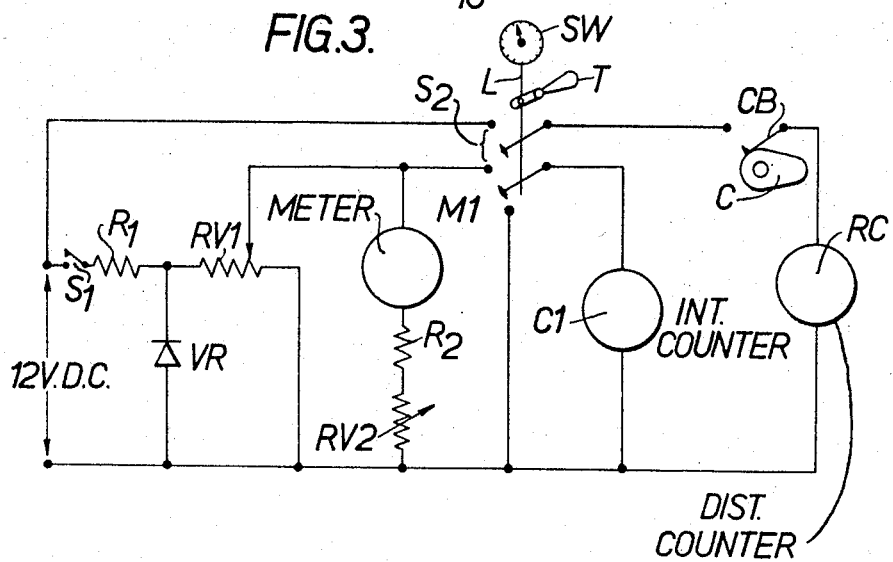
INVENTOR
Walter W. H. Clarke
By Watson, Cole, Grindle & Watson
ATTORNEYS

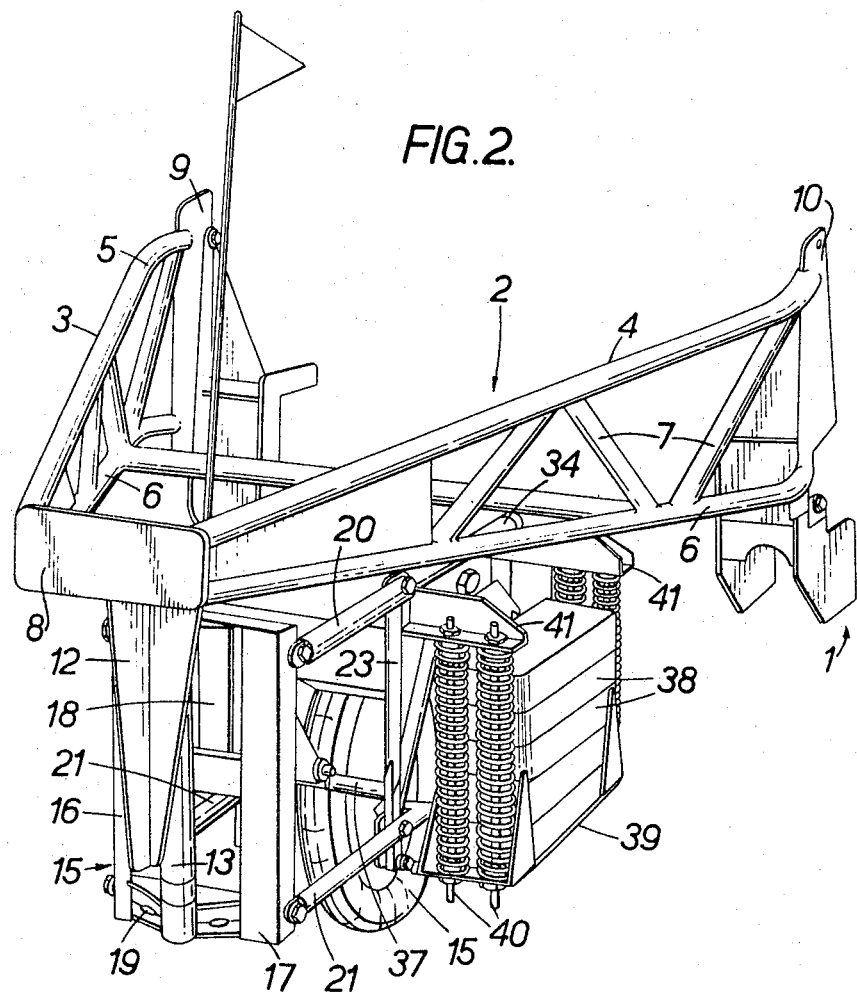

United States Patent Office 3,332,276
Patented July 25, 1967

3,332,276
SLUSH DRAG METERS
Walter Wilson Hugh Clarke, Hampshire, England, assignor to Inertia Switch Limited, Surrey, England, a company of Great Britain
Filed Nov. 10, 1964, Ser. No. 410,168
Claims priority, application Great Britain, Nov. 14, 1963, 45,088/63
8 Claims. (Cl. 73—9)

This invention relates to a method and apparatus for determining the drag which would be exerted on an aircraft or land vehicle wheel by slush or water lying on a surface on which the wheel travels.

Recently, unexplained behaviour of aircraft during or shortly after take-off in bad weather conditions has led to the need for a reliable method which can readily be used in assessing the amount of drag which an aircraft may encounter on taking-off or landing. Furthermore such a method may also be employed to determine the drag experienced by a land vehicle in similar bad weather conditions.

The object of the present invention is therefore to provide a method and apparatus for determining drag on a test wheel so that the results obtained therefrom can be used in determining the behaviour of a wheel on a particular aircraft or land vehicle when encountering conditions similar to those encountered by the test wheel.

Accordingly there is provided in accordance with the invention apparatus for determining wheel drag which comprises a frame, a test wheel rotatably mounted in the frame and displaceable relatively thereto on the test wheel encountering water or slush lying on a surface over which the test wheel is driven, a transducer coupled to the test wheel to measure the displacement thereof, means for measuring over a predetermined time interval the distance travelled by the wheel, and means for measuring the average displacement thereof during said predetermined time interval.

Preferably the wheel is loaded to prevent aquaplaning at the predetermined speed, the loading taking the form of weights disposed on each side of said wheel on platforms supported by the frame.

In a preferred embodiment of the invention, to be described in detail hereinafter, the force referred to as the drag force produced by water or slush lying on the surface on which the test wheel travels pushes the test wheel back against a biasing spring having a predeterminable rating. Thus the average displacement of the wheel over a predetermined time interval can be directly related to the average drag force encountered by the wheel in terms of the spring rating. For example if the spring is rated at 150 lbs./inch. and the displacement of the wheel resulting from drag is a half an inch, then the value of the drag is 75 lbs. and the measuring means is calibrated accordingly.

In a further aspect of the invention there is provided a method of determining wheel drag which comprises pushing ahead of a land vehicle over the surface on which slush or water is lying a test wheel mounted in a frame and displaceable horizontally relatively thereto on the test wheel encountering the water or slush, and measuring during a predetermined time interval during which the speed of the land vehicle is maintained substantially constant the distance travelled and the average displacement of the test wheel caused by the water or slush.

It is difficult in bad weather conditions for a driver to maintain the speed of the land vehicle constant enough for the speedometer reading of the vehicle to be useful, but it can normally be held within a speed range which is acceptable for averaging purposes. In consequence the time interval referred to above is in practice usually in the order of 5 to 30 seconds.

The average value of the drag forces as a proportion of the test wheel loading and related to a known ground speed determined by the time interval and the measure of the distance travelled by the wheel enables an aircraft's drag coefficient to be determined for the same conditions as those encountered by the test wheel.

In order that the invention may be fully understood a preferred embodiment thereof will now be described in detail with reference to the accompanying drawings in which:

FIGURE 1 shows a side view of apparatus according to a preferred form of the present invention;

FIGURE 2 shows an isometric view of the apparatus shown in FIGURE 1, and

FIGURE 3 shows an electrical circuit for use with the apparatus of FIGURES 1 and 2.

Referring now to FIGURE 1, the apparatus 1 includes a main A-frame 2 comprising side members 3 and 4, each having two struts 5 and 6 braced by interconnecting struts 7, the two side members 3 and 4 being joined at their forward end by a plate 8 and each having at their rearward ends, brackets 9 and 10 for coupling the apparatus to the front of a vehicle such as a land rover or jeep (not shown). Depending from a cross member 11 behind the plate 8 and secured to the upper forward portions of the struts 6 is a bracket 12 having a vertical pivot rod 13 journalled therein for pivotally supporting a sub-frame 14 in which a test wheel 15 is rotatably mounted.

The sub-frame 14 comprises a forward unit having vertical side members 16 and 17 interconnected by horizontal brackets 18 and 19 secured to the top and bottom portions of the rod 13. Pairs of upper and lower tubular members 20 and 21 are pivoted to the upper and lower ends of the members 16 and 17 respectively by means of bolts 22, the rearward ends of members 20 and 21 being pivoted to vertical members 23 (one each side of the sub-frame) by means of bolts 24. To a downward extension 25 of one member 23 is pivoted a rod 26 which passes through a collar 27 secured to a plate 28 in which the wheel 15 is mounted. The rearward end of rod 26 has a collar 29 held in place by nuts 30 and a compression spring 31 is located about the rod betwen collars 27 and 29. The plate 28 is pivoted in a member 32 secured to upper members 34 (only one being shown) which are rigidly secured to the upper ends of vertical members 23. A spray shield 33 is located above the wheel 15 between the members 34.

An electrical transducer 35 is coupled between the member 23 to which the rod 26 is pivotally secured and the plate 28. A damper 36 is mounted between a cross member 37 interconnecting the lower ends of members 23 and the upper part of the forward unit to damp vertical oscillations of the wheel.

The sub-frame is loaded by weights 38 supported on platforms 39, one each side of the wheel. Each platform is suspended by means of coil springs 42 attached to brackets 41 extending outwards from the sub-frame, rods 40 being placed through each spring and secured to the brackets to provide guides for the platforms.

As the wheel is mounted in a sub-frame which is pivoted to the main frame by the vertical pivot rod 13, the wheel has a castor action and can also move in a vertical plane as the sub-frame members 20 and 21 are pivoted to the forward unit of sub-frame 14. Damping of the vertical movement of the wheel is provided by damper 36 and horizontal damping is provided by a damper 43 through a linkage coupled to the sub-frame 14.

It would be desirable to use a complete aircraft wheel for test wheel 15 if it were feasible to push it at speeds comparable with those achieved just before take-off, and even if this sort of speed were not possible, the use of a complete aircraft wheel would still probably be ideal. However, size and weight considerations make it necessary to achieve a compromise and to select a wheel whose size and weight will enable it to be pushed by a normal vehicle.

The normal use of an aircraft wheel requires a 30% deflection, hence the diameter of wheel 15 and tyre width and depth determine the area which will be in contact with the ground under 30% deflection. For the apparatus a test wheel of about 16″ outside diameter with tyre 2″ wide x 2″ deep is selected.

A 30% deflection of this tyre gives a gross tyre/ground contact area Ag equal to tyre width multiplied by chord given by 30% deflection i.e.

$$\text{Wheel diameter} = \frac{(\frac{1}{2} \text{ chord})^2}{\text{Deflection}} + \text{deflection}$$

so $$16 = \frac{(\frac{1}{2} \text{ chord})^2}{0.6} + 0.6$$

$$\therefore 15.4 \times 0.6 = (\frac{1}{2} \text{ chord})^2$$

$$\therefore \text{Chord} = 6.25'' \text{ approximately}$$

so $Ag = 6.25 \times 2 = 12.5$ square inches

This determines the downward pressure which must be exerted on the test wheel 15 and is compatible with a load of about 500 lbs.

If it is assumed that the drag force on wheel 15 is 20% that is 0.2 g., and if it is assumed that the wheel 15 loaded with weights 38 of 500 lbs. is propelled by a 3000 lb. vehicle, then the drag thrust would be 20% of the total weight i.e.

$$\frac{20}{100} \times 3500 = 700 \text{ lbs.} \quad (1)$$

At a speed of 90 ft./sec. (approximately 60 m.p.h.) the work rate is given by the formula $$FV = 550 \text{ H.P.} \quad (2)$$

where $F$ = Force in lbs. to be overcome
$V$ = Velocity in ft./sec.
$HP$ = Horsepower required.

$$HP = \frac{FV}{550} = \frac{700 \text{ lbs.} \times 90 \text{ ft./sec.}}{550} = 114 \text{ approx.}$$

(It is here assumed that the drag on the wheels of the vehicle pushing the apparatus is of the same magnitude as as that on the test wheel 15.)

If the vehicle used is unable to reach 90 ft./sec. in slush producing a drag thrust of 700 lbs. then assuming the drag to be proportional to speed squared, the same depth of slush should give 15% slush drag at 67½ ft./sec. (45 m.p.h. approx.).

Thus, applying Formula 1 again $$\text{Slush drag thrust} = \frac{15}{100} \times 3500 = 525 \text{ lbs.}$$

and utilizing this value in Formula 2 we see that $$HP = \frac{FV}{550} = \frac{525 \times 67\frac{1}{2}}{550} = 65 \text{ approx.}$$

Thus a jeep or land rover as the vehicle will achieve measurements of drag forces in a speed bracket 40–60 m.p.h. depending on conditions.

The rate of spring 31 is chosen at 150 lbs./in. and the transducer 35 is in the form of a potentiometer with a 2″ movement. The figures for the spring and potentiometer movement allow a maximum drag of 0.3 g. to be recorded and a 1″ deflection point will correspond with 0.15 g.

For recording the drag experienced by the wheel 15 in a circuit as shown in FIGURE 3 is used.

The average values of drag are measured by an integrating motor driven counter $Cl$ which is connected to the slider of potentiometer RV1 forming the transducer 35 of FIGURE 1 via a single pole double throw switch forming one gang of a two gang switch $S_2$. Current is supplied to the potentiometer RV1 from a D.C. source via an on/off switch $S_1$ and a fixed resistance R1, a stabilising diode VR such as a Zener diode being connected across the potentiometer RV1.

Instantaneous values of drag are read from a meter M1 having calibrating resistances R2, RV2, the meter M1 being connected to the slider of potentiometer RV1 and the common line of the D.C. source. A revolution counter RC is connected to the D.C. source via a circuit breaker CB operated by a cam C coupled to the test wheel 15 and a single pole single throw switch forming the other gang of switch $S_2$. A mechanical connection L, is also made from the operating toggle T of switch $S_2$ to a stop watch SW.

To measure the drag produced by slush lying on a runway, the apparatus of FIGURE 1 is coupled to the front of a land rover or similar vehicle and driven down the runway. When a speed is achieved at which it is desired to make measurements of drag and that speed can be held substantially constant, the driver, or an operator sitting with the driver moves the toggle T to throw the switch $S_2$ which starts the stop watch, connects the integrating counter to the potentiometer RV1 and the revolution counter to the D.C. source. When it is apparent that the speed of the vehicle cannot be maintained constant, or at a predetermined time after throwing the switch $S_2$, the latter is thrown to its off position by moving the toggle T thus de-energising the integrating and revolution counters and stopping the stop watch. During the test run instantaneous values of drag can be read from the meter M1 at any time.

The stop watch and the revolution and integrating counters may be re-set to zero after a test run, or may be stopped and started to produce cumulative readings. The stop watch may be an electrical stop watch energised via a further switch ganged to $S_2$ by the D.C. source.

Since the speed of the integrating motor is proportional to current which in turn is proportional to the setting of the slider of potentiometer RV1 and thus the displacement of wheel 15, the number of counts on the counter driven by the integrating motor divided by the stop watch reading will give the number of counts per minute. Assuming the counts per minute are 50 for a current resulting from a 1 inch movement of the slider of potentiometer RV1 which has a total movement of two inches, and the spring 31 is rated at 150 lbs./inch then a count of 50 is equivalent to a drag of 150 lbs. From the reading on the stop watch and the revolution counter and knowing the diameter of the test wheel 15, the speed can be accurately calculated.

Thus particular drag force figures for the test wheel can be obtained for particular conditions on the runway and these figures can be related to the wheels of a particular aircraft so that the drag on such an aircraft when landing on the aforementioned runway under conditions such as those existing at the time the test run was made can be determined.

Whilst there has been described and illustrated one preferred embodiment of the present invention, it will be appreciated that changes in the structure of the apparatus may be made without departing from the scope of the present invention. For example, instead of the wheel 15 being supported in a sub-frame, it could be mounted on a castor support slidable along a frame adapted to be hinged to a vehicle so that the frame pivots about a horizontal axis. The castor support could be spring urged in the direction of intended travel and a potentiometer connected to the frame and castor support so that deflection of the wheel on encountering slush or rain water produces a proportional alteration in the setting of the potentiometer RV1. The latter may be connected as illustrated in FIGURE 3 or any other circuit which produces either or both instantaneous and average readings of drag.

In certain applications it may be desirable to use means for measuring the wheel deflection under drag forces other than the electrical means herein described. For example the transducer 35 could be either hydraulic or mechanical and apparatus connected thereto to register both instantaneous and average values of drag.

I claim:

1. Apparatus for determining the drag which would be exerted at a predetermined speed on an aircraft or land vehicle wheel by slush or water lying on a surface on which said wheel travels, said apparatus comprising a frame, a test wheel, means in said frame rotably mounting said test wheel to be displaceable in a horizontal direction relatively to said frame on said test wheel encountering water or slush lying on a surface over which said test wheel is driven, a transducer coupled to said test wheel to measure horizontal displacement thereof when said test wheel travels over a surface on which water or slush is lying, means coupled to said test wheel for measuring over a predetermined time interval the distance travelled by said test wheel and means coupled to said transducer for measuring the horizontal displacement of said test wheel with respect to the frame, due to encountering said water or slush, over said predetermined time interval.

2. Apparatus as claimed in claim 1 including a spring biasing said test wheel against horizontal displacement thereof, said spring having a predetermined rating.

3. Apparatus for determining the drag which would be exerted at a predetermined speed on an aircraft or land-vehicle wheel by slush or water lying on a surface on which said wheel travels, said apparatus comprising a main frame, a sub-frame pivoted to said main frame, a test wheel, means in said sub-frame rotably mounting said test wheel to be displaceable horizontally relatively to said sub-frame on said test wheel encountering water or slush lying on a surface over which said test wheel is driven, a spring biasing said test wheel against horizontal displacement thereof relative to said sub-frame, said spring having a predetermiend rating, a transducer coupled to said test wheel to measure horizontal displacement thereof when said test wheel travels over a surface on which water or slush is lying, means coupled to said test wheel for measuring over a predetermined time interval the distance travelled by said test wheel, and means coupled to said transducer for measuring the average displacement of said test wheel with respect to the frame, due to encountering said water or slush, over said predetermined time interval.

4. Apparatus as claimed in claim 3 including a first platform attached alongside said test wheel to said sub-frame and a second platform attached alongside said test wheel to said sub-frame opposite said first platform, said first and second platforms being adapted to support weights to give said test wheel a desired loading.

5. Apparatus for determining the drag which would be exerted at a predetermined speed on an aircraft or land-vehicle wheel by slush or water lying on a surface on which said wheel travels, said apparatus comprising a main frame, a sub-frame pivoted to said main frame, a test wheel, means in said sub-frame rotably mounting said test wheel to be displaceable horizontally relatively to said sub-frame on said test wheel encountering water or slush lying on a surface over which said test wheel is driven, a spring biasing said test wheel against horizontal displacement thereof relative to said sub-frame, said spring having a predetermined rating, a transducer coupled to said test wheel to measure horizontal displacement thereof when said test wheel travels over a surface on which water or slush is lying, said transducer comprising a potentiometer having a slider and being connected in an electrical circuit to provide signals proportional to the horizontal displacement of said test wheel, means coupling said slider to said test wheel, an integrating counter connected to said potentiometer for measuring over a predetermined time interval the average horizontal displacement due to drag of said test wheel, and means coupled to said test wheel for measuring over said predetermined time interval the distance travelled by said test wheel.

6. A method of determining the drag which would be exerted at a predetermined speed on an aircraft or land-vehicle wheel by slush or water lying on a surface on which said wheel travels, which method comprises pushing over said surface ahead of a land vehicle a test wheel mounted in a frame to be horizontally displaceable relatively thereto on said test wheel encountering the water or slush, maintaining the speed of said land vehicle substantially constant over a predetermined time interval, measuring during said predetermined time interval the distance travelled by said test wheel, and measuring during said predetermined time interval the average horizontal displacement of said test wheel produced by the water or slush.

7. The method of claim 6 wherein said predetermined time interval is in the range of 5 to 30 seconds.

8. The method of claim 6 which includes loading said test wheel to prevent aquaplaning at said predetermined speed.

References Cited

UNITED STATES PATENTS

| | | | |
|---|---|---|---|
| 2,496,405 | 2/1950 | Foufounis | 73—146 X |
| 2,946,644 | 7/1960 | Henry. | |

JAMES J. GILL, *Acting Primary Examiner.*

RICHARD C. QUEISSER, *Examiner.*

C. A. RUEHL, *Assistant Examiner.*